(12) United States Patent
Singh et al.

(10) Patent No.: US 12,548,290 B2
(45) Date of Patent: Feb. 10, 2026

(54) METHOD OF AND SYSTEM FOR CAPTURING COLOR IMAGES

(71) Applicants: Tripurari Singh, Bethesda, MD (US); Mritunjay Singh, Irvine, CA (US)

(72) Inventors: Tripurari Singh, Bethesda, MD (US); Mritunjay Singh, Irvine, CA (US)

( * ) Notice: Subject to any disclaimer, the term of this patent is extended or adjusted under 35 U.S.C. 154(b) by 429 days.

(21) Appl. No.: 18/050,467

(22) Filed: Oct. 28, 2022

(65) Prior Publication Data

US 2023/0169750 A1  Jun. 1, 2023

Related U.S. Application Data

(60) Provisional application No. 63/273,054, filed on Oct. 28, 2021.

(51) Int. Cl.
*G06T 5/70* (2024.01)
*G06T 3/4015* (2024.01)
*G06T 5/20* (2006.01)
*G06V 10/56* (2022.01)
*H04N 1/60* (2006.01)
*H04N 25/46* (2023.01)

(52) U.S. Cl.
CPC ............ *G06V 10/56* (2022.01); *G06T 3/4015* (2013.01); *G06T 5/20* (2013.01); *G06T 5/70* (2024.01); *H04N 1/6005* (2013.01); *H04N 1/6016* (2013.01); *H04N 25/46* (2023.01); *G06T 2207/10024* (2013.01); *G06T 2207/20016* (2013.01)

(58) Field of Classification Search
CPC ......... G06V 10/56; G06T 3/4015; G06T 5/20; G06T 5/70; G06T 2207/10024; G06T 2207/20016; H04N 1/6005; H04N 1/6016; H04N 25/46; H04N 25/134
USPC .......................................................... 382/162
See application file for complete search history.

(56) References Cited

U.S. PATENT DOCUMENTS

| | | | |
|---|---|---|---|
| 8,934,034 B2* | 1/2015 | Nayar | H01L 27/14621 348/277 |
| 9,766,467 B2* | 9/2017 | Sohn | G02B 27/1013 |
| 2016/0255286 A1* | 9/2016 | Tsukada | H04N 25/134 348/162 |
| 2017/0019614 A1* | 1/2017 | Tsukada | H04N 23/11 |
| 2021/0124242 A1* | 4/2021 | Guo | G03B 21/2033 |

* cited by examiner

*Primary Examiner* — Ali Bayat

(57) ABSTRACT

A system for capturing color images comprising an image sensor with an array of light sensitive photosites of a plurality of colors. Each color has its own spectral sensitivity. Colors with a substantially low color separation are assigned a substantially high density of pixels in the photosite array and colors with a substantially high color separation are assigned a substantially low density of pixels in the photosite array. A digital image signal processor is adapted to receive a raw mosaicked image from said image sensor when the image sensor is impacted with light, and to reconstruct a full color image from the raw image data. Optionally, the raw image data is demosaicked, a chroma denoiser is applied to the image data and the image data is converted to a specified color space, wherein application of the chroma denoiser and conversion to a specified color space are performed in any order.

34 Claims, 12 Drawing Sheets

| L | M | S | M | L | S |
|---|---|---|---|---|---|
| M | L | M | L | M | L |
| L | M | L | M | L | M |
| M | L | S | L | M | S |
| L | M | L | M | L | M |
| M | L | M | L | M | L |

FIG. 3

| L | M | S | M | L | S |
|---|---|---|---|---|---|
| M | L | M | L | M | L |
| L | S | L | M | L | M |
| M | L | M | L | M | S |
| L | M | L | M | L | M |
| M | L | M | L | M | L |

FIG. 4

| S | M | L | M |
|---|---|---|---|
| M | L | M | L |
| L | M | S | M |
| M | L | M | L |

FIG. 5

| S | M | L | M | S | M | L | M |
|---|---|---|---|---|---|---|---|
| M | L | M | L | M | L | M | L |
| L | M | S | M | L | M | L | S |
| M | L | M | L | M | L | M | L |

FIG. 6

| L | M | L | M |
|---|---|---|---|
| M | L | M | L |
| L | M | S | M |
| M | L | M | S |

FIG. 7

| L | M | L | M | L | M | L | M |
|---|---|---|---|---|---|---|---|
| M | L | M | L | M | L | M | L |
| L | M | S | M | L | M | L | S |
| M | L | M | S | M | L | S | L |
| L | M | L | M | L | M | L | M |
| M | L | M | L | M | L | M | L |
| L | M | L | S | L | M | S | M |
| M | L | S | L | M | L | M | S |

FIG. 8

| L | M | L | M | L | M |
|---|---|---|---|---|---|
| M | L | M | L | M | L |
| L | M | L | M | L | M |
| M | L | M | S | M | S |
| L | M | L | M | S | M |
| M | L | M | S | M | S |

FIG. 9

| L | M | L | M | L | M |
|---|---|---|---|---|---|
| M | L | M | L | M | L |
| L | M | L | M | L | M |
| M | L | M | L | S | L |
| L | M | L | S | L | S |
| M | L | M | L | S | L |

FIG. 10

| L | M | L | M | L | M | L | M |
|---|---|---|---|---|---|---|---|
| M | L | M | L | M | L | M | L |
| L | M | L | M | L | M | L | M |
| M | L | M | L | M | L | M | L |
| L | M | L | M | S | M | S | M |
| M | L | M | L | M | S | M | S |
| L | M | L | M | S | M | S | M |
| M | L | M | L | M | S | M | S |

FIG. 11

METHOD OF AND SYSTEM FOR CAPTURING COLOR IMAGES

RELATED APPLICATIONS

This application is based on and claims the benefit of priority of U.S. Provisional Application No. 63/273,054, filed Oct. 28, 2021, which is hereby incorporated by reference in its entirety.

BACKGROUND OF THE INVENTION

The present disclosure relates to image sensors with improved color accuracy and sensitivity.

Colorimetric image capture with three basic colors requires their spectral sensitivities to be similar to those of human retinal cones. This is especially problematic for the L, M cones due the large overlap in their spectral sensitivities. Recovering accurate R (red) and G (green) from L, M requires differencing their signals resulting in noise amplification.

State of the art systems overcome the problem of noise amplification by approximating R, G, B spectral sensitivities obtained after differencing the L, M, S spectral sensitivities respectively. While the spectral sensitivities of L, M, S are simple, the corresponding spectral sensitivities of R, G, B obtained by differencing are complex and impractical because of low or negative sensitivity in certain sections of the electromagnetic spectrum. Compromise R, G, B filters are used resulting in poor color accuracy.

What is needed is an improved technique for capturing color images.

BRIEF SUMMARY OF THE INVENTION

A system for capturing color images comprising an image sensor with an array of light sensitive photosites of a plurality of colors. Each color has its own spectral sensitivity. Colors with a substantially low color separation are assigned a substantially high density of pixels in the photosite array and colors with a substantially high color separation are assigned a substantially low density of pixels in the photosite array. A digital image signal processor is adapted to receive a raw mosaicked image from said image sensor when the image sensor is impacted with light, and to reconstruct a full color image from the raw image data. Optionally, the raw image data is demosaicked, a chroma denoiser is applied to the image data and the image data is converted to a specified color space, wherein application of the chroma denoiser and conversion to a specified color space are performed in any order.

BRIEF DESCRIPTION OF THE DRAWINGS

FIG. 3 is the minimal repeating unit of a color filter array pattern, in accordance with an embodiment of the present invention, where 1 in 9 pixels is of color S, and the remaining pixels are of colors L and M. The S pixel locations form a square lattice.

FIG. 4 is the minimal repeating unit of a color filter array pattern, in accordance with an embodiment of the present invention, where 1 in 9 pixels is of color S, and the remaining pixels are of colors L and M. The S pixel locations do not form a square lattice.

FIG. 5 is the minimal repeating unit of a color filter array pattern, in accordance with an embodiment of the present invention, where 1 in 8 pixels is of color S, and the remaining pixels are of colors L and M. The S pixel locations form a square lattice.

FIG. 6 is the minimal repeating unit of a color filter array pattern, in accordance with an embodiment of the present invention, where 1 in 8 pixels is of color S, and the remaining pixels are of colors L and M. The S pixel locations do not form a square lattice.

FIG. 7 is the minimal repeating unit of a binnable color filter array pattern, in accordance with an embodiment of the present invention, where 1 in 8 pixels is of color S, and the remaining pixels are of colors L and M. After binning, a 2×2 block of pixels generates 2 values of raw image data.

FIG. 8 is the minimal repeating unit of a binnable color filter array pattern, in accordance with an embodiment of the present invention, where 1 in 8 pixels is of color S, and the remaining pixels are of colors L and M. After binning, a 2×2 block of pixels generates 2 values of raw image data.

FIG. 9 is the minimal repeating unit of a binnable color filter array pattern, in accordance with an embodiment of the present invention, where 5 in 36 pixels are of color S, and the remaining pixels are of colors L and M. After binning, a 3×3 block of pixels generates 2 values of raw image data.

FIG. 10 is the minimal repeating unit of a binnable color filter array pattern, in accordance with an embodiment of the present invention, where 1 in 9 pixels is of color S, and the remaining pixels are of colors L and M. After binning, a 3×3 block of pixels generates 2 values of raw image data.

FIG. 11 is the minimal repeating unit of a binnable color filter array pattern, in accordance with an embodiment of the present invention, where 1 in 8 pixels is of color S, and the remaining pixels are of colors L and M. After binning, a 4×4 block of pixels generates 2 values of raw image data.

DETAILED DESCRIPTION OF THE INVENTION

Figure 1:
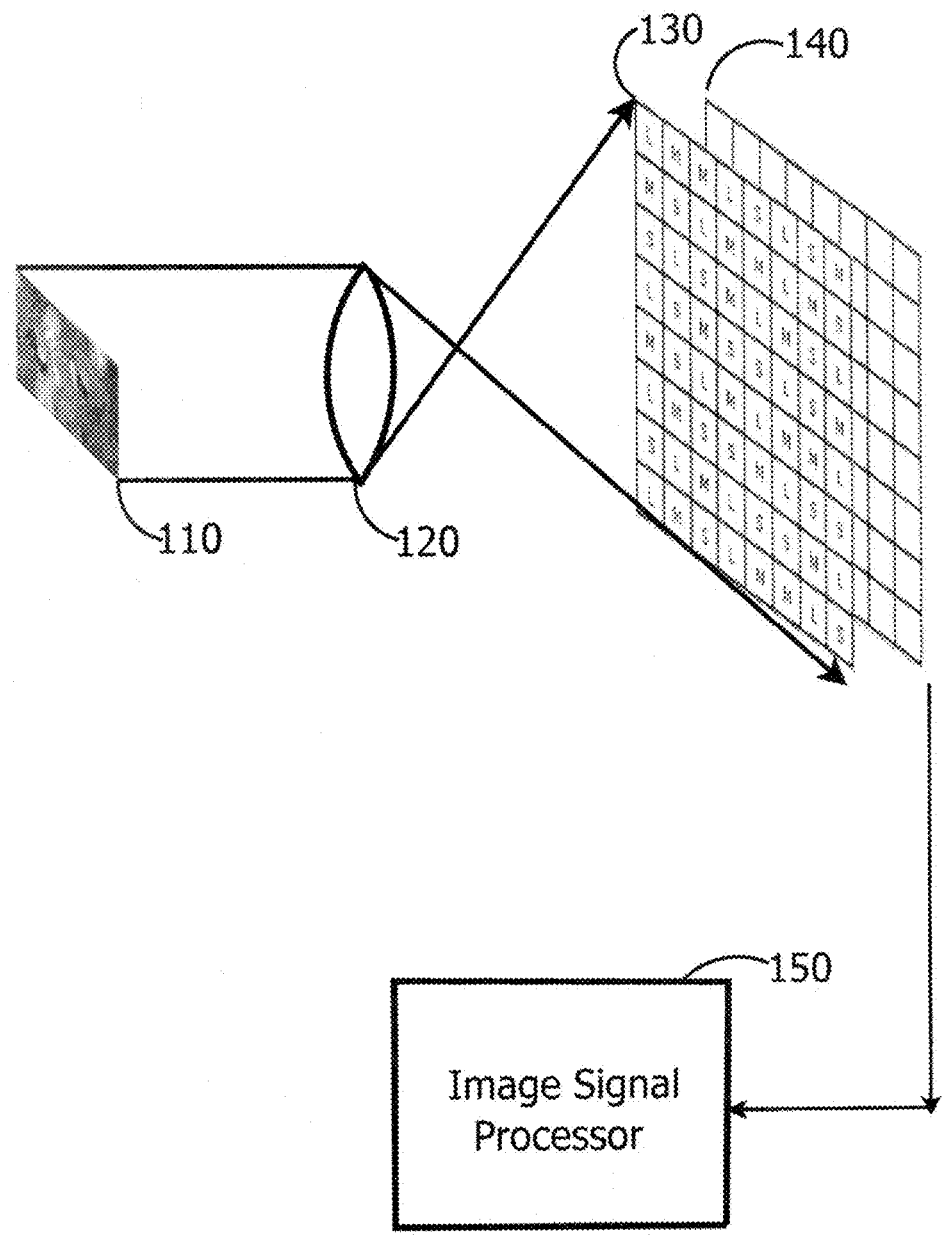
FIG. 1 is a schematic diagram of an exemplary color imaging system in accordance with an embodiment of the present invention.

A system for capturing color images in accordance with an embodiment of the present invention is shown in FIG. 1. Such a system can be implemented as part of a digital camera, for example. As shown in FIG. 1, an optical image of a scene 110 passes through and is focused by a lens 120. The image is then filtered by a Color Filter Array (CFA) 130 and captured by an image sensor 140. The image sensor 140 can include, for example, a charge-coupled device sensor (CCD sensor) or an active-pixel sensor (CMOS sensor). In either case, the image sensor 140 comprises an array of discrete light-sensing areas (i.e. photosites). Each photosite converts light energy impacting the photosite into a numeric value. The output of the image sensor 140 is a data collection consisting of the numeric values generated by each photosite. This "raw" data output of the image sensor 140 is sent to a digital image signal processor (ISP) 150 that receives, stores and processes the data, as described herein, to reconstruct an electronic image of the scene from the received image sensor data. The reconstructed electronic image can then be stored, copied, reproduced, transmitted and/or displayed. For example, the reconstructed image can be printed on paper or other medium to generate a physical representation of the image or the image displayed on a digital display of a mobile phone.

The image processor of the present invention can be implemented in hardware, e.g, as a specialized application-specific integrated circuit (ASIC) or other specialized hardware. Alternatively, the image processor can be implemented by a software program operating on a general-purpose or specific-purpose hardware computing platform. All such implementations of the image processor can reside in a device such as a camera, a phone, a personal computer or any other suitable hardware device.

In the context of an image sensor, a "raw pixel" or simply a "pixel" or a "photosite" refers to a discrete light sensing area and the associated circuit to measure the resulting charge and digitize the measurement. A pixel senses only one color in the types of image sensors considered by this invention. Each color is associated with a spectral sensitivity which is the detection efficiency of the photosite as a function of the wavelength of the light incident on it. In the context of an image, a "pixel" refers to a particular location in the image with one value associated with it for a monochrome image and multiple values associated with it for a color or a multispectral image.

Figure 2:
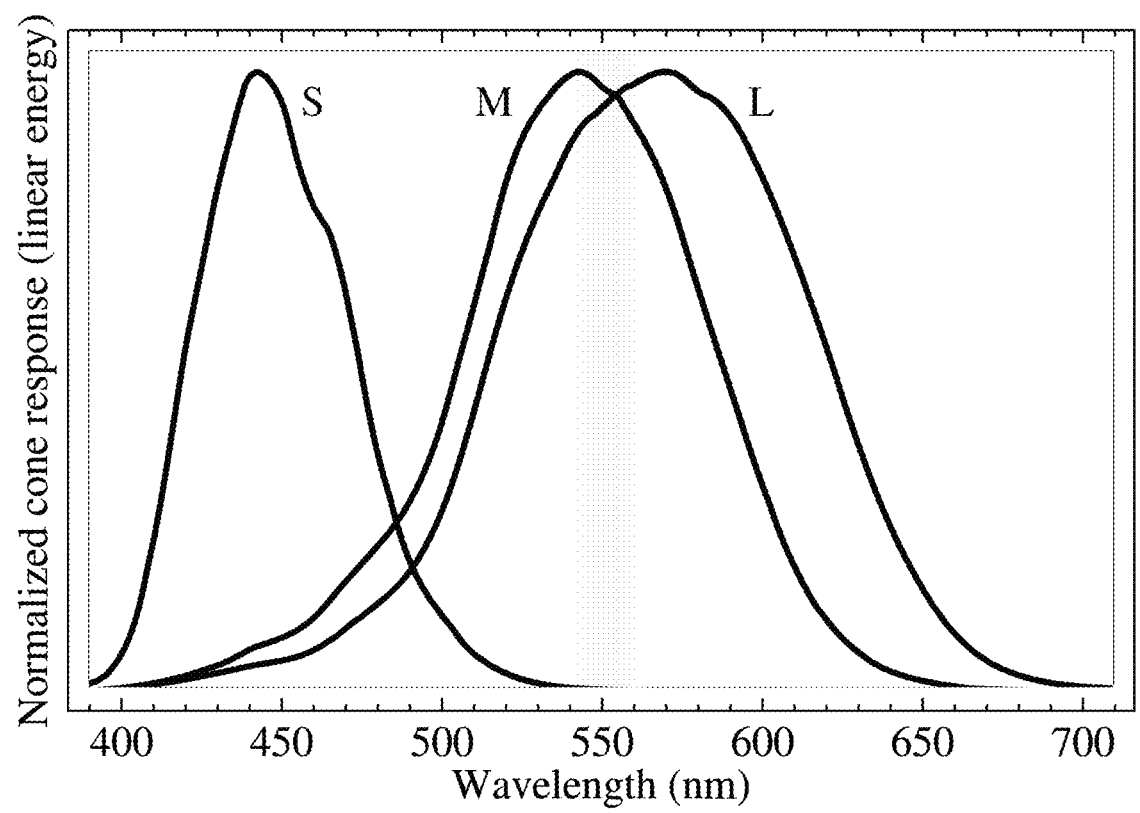
FIG. 2 is a plot of the normalized spectral sensitivities of the S, M, L cones of the human retina.

The pixels of the image sensor have a set of spectral sensitivities L, M, S modeled on the spectral sensitivities of the L, M, S cones of the human retina respectively as shown in FIG. 2. The spectral sensitivities of the L, M, S pixels are either approximately equal to the spectral sensitivities of the L, M, S cones or approximately equal to a linear combination of the L, M, S cones. In the latter case, the spectral sensitivities should be chosen so as to minimize manufacturing difficulties and deviation from the Luther condition.

The spectral sensitivity of a pixel is a function of the quantum efficiency of the light to charge conversion device, the spectral sensitivity of the color filter, the pixel to pixel crosstalk and other factors. If the color cast of the lens and other optics used with the sensor is known, it should also be taken into account when determining the spectral sensitivity of the pixel.

All Color Filter Arrays considered by this invention consist of a repeating pattern of color filters. In this context a CFA can be defined by a patch of pixels, known as a repeating unit, which is juxtaposed horizontally, vertically, or a combination thereof, followed by an operation of trimming its edges. A minimal repeating unit is a repeating unit that cannot itself be decomposed into smaller repeating units. Note that any minimal repeating unit m pixels wide and n pixels high is not unique with each m×n section of the CFA forming a "phase" of the CFA. A CFA with a minimal repeating unit m pixels wide and n pixels high has m×n distinct phases.

The image signal processor (ISP) 150 first demosaicks the sensor data to reconstruct the full L, M, S color planes, then applies a chroma denoiser followed by color space conversion to obtain the RGB image. Color conversion amplifies the noise in the L, M color planes more than in the S color plane owing to the large overlap in the spectral sensitivities of L, M. Noise in the L, M color planes is controlled by the chroma denoiser in conjunction with the high transmittance of the L, M color filters and their high density in the color filter array (CFA).

L color filter has higher transmittance than red (R), color filter since its frequency pass band is wider. This leads to higher SNR of L pixels than R pixels.

Color Filter Array Patterns

The color filter array patterns employed have a higher density of L, M pixels than S pixels. One class of patterns can be generated by decomposing the sampling lattice into two quincunx lattices, assigning L to one quincunx and M to the other. The CFA generation is completed by replacing a minority of either L pixels or M pixels, or both, with S pixels.

FIG. 3 shows an example CFA where 1 in 9 pixels are of color S and the remaining pixels are of colors L, M. The S pixels are arranged in a regular pattern. Irregular variants of the CFA pattern can be generated by perturbing 1 in 4 S pixels in a 6×6 tile of pixels by a one pixel distance. Diagonal displacement of S by one pixel affords the CFA greater resistance to aliasing and false color than horizontal or vertical displacement by one pixel. An example of such an irregular pattern is shown in FIG. 4.

Figure 5:
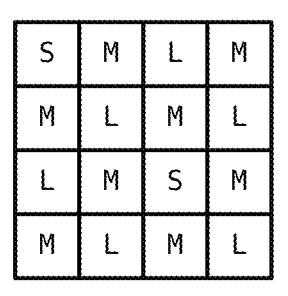
Figure 6:
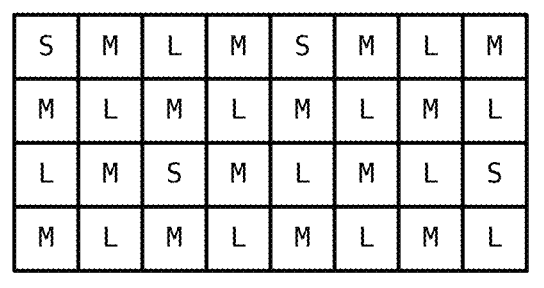

FIG. 5 shows an example CFA where 1 in 8 pixels are of color S and the remaining pixels are of colors L, M. The S pixels are arranged in a regular pattern. Irregular variants of the CFA pattern can be generated by perturbing 1 in 4 S pixels in a 4×8 tile of pixels by a one pixel distance. Horizontal or vertical displacement of S by one pixel affords the CFA greater resistance to aliasing and false color than diagonal displacement by one pixel. An example of such an irregular pattern is shown in FIG. 6.

Figure 7:
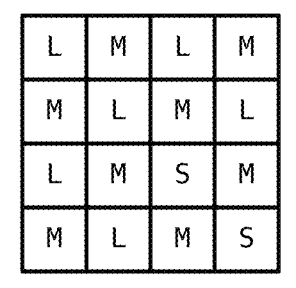

FIG. 7 depicts a 2:1 binnable CFA. The pattern can be divided into tiles of 2×2 pixels that are binned along the diagonal and the anti-diagonal to generate 1 value of raw image data per color per tile. Binning is always performed on a pair of pixels of the same color. FIG. 8 depicts a variant of the 2:1 binnable CFA that places some S pixels along the diagonals and others along the antidiagonals of the tiles.

FIG. 9 depicts a binnable CFA where the pattern can be divided into tiles of 3×3 pixels. The two quincunx lattices within each tile, composed of either 4 or 5 pixels, are binned to generate 1 value of raw image data per color per tile. Binning is always performed on pixels of the same color. FIG. 10 depicts a variant of the CFA in FIG. 9.

FIG. 11 depicts a binnable CFA where the pattern can be divided into tiles of 4×4 pixels. The two quincunx lattices within each tile, composed of 8 pixels, are binned to generate 1 value of raw image data per color per tile. Binning is always performed on pixels of the same color.

Other similar patterns can be generated by reflections, rotations, lateral inversions, translations, phase changes and swapping of L, M pixel colors.

The Image Signal Processor

Figure 12:
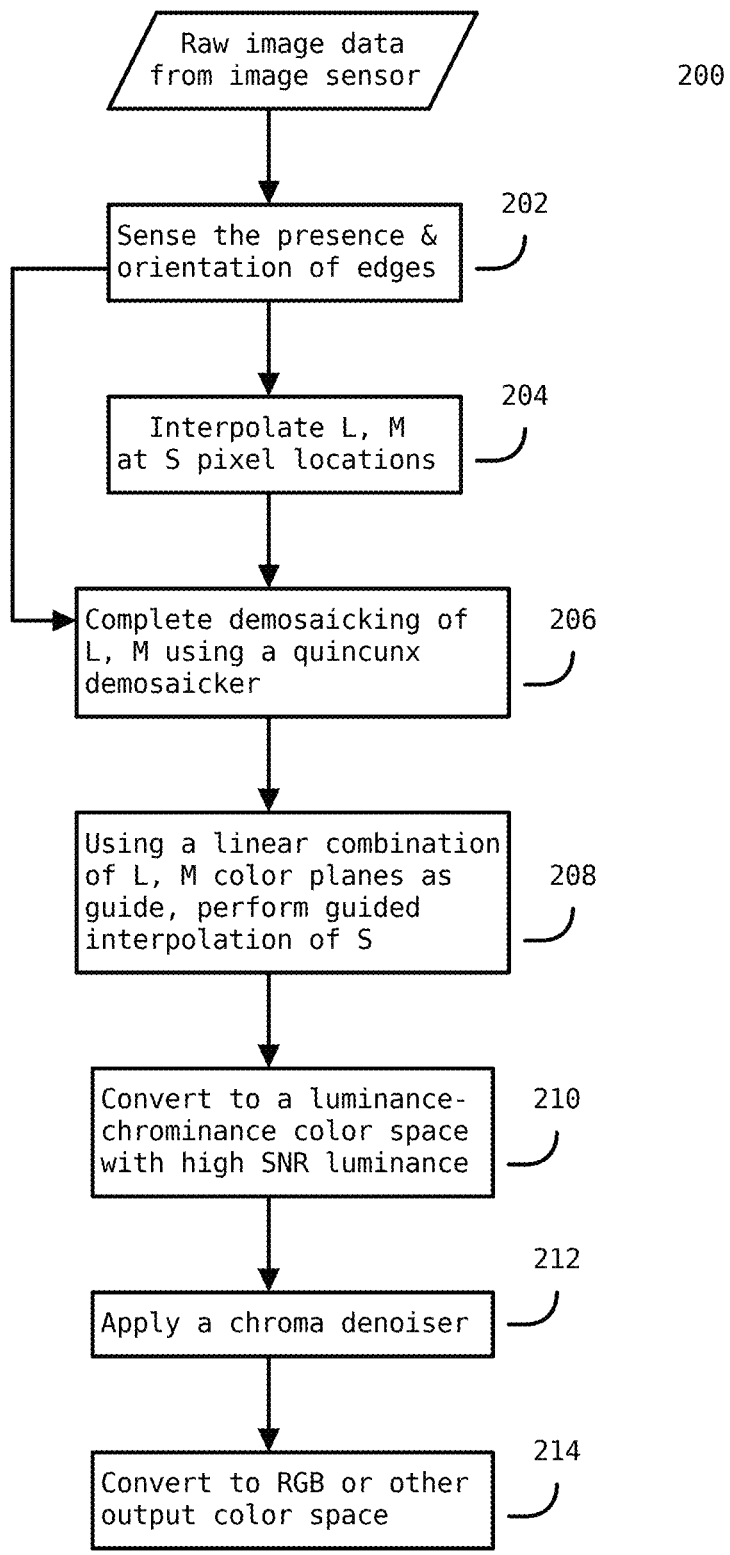
FIG. 12 is flowchart of the Image Signal Processing steps needed to reconstruct the output image from the raw image sensor data, in accordance with an embodiment of the present invention.

A process 200 performed by the image signal processor 150 (FIG. 1) is illustrated in the flowchart of FIG. 12. Without loss of generality, assume that the quincunx lattice comprising of pixel locations (x, y), where x+y is odd, contains all the L pixels and the other quincunx lattice comprising of pixel locations (x, y), where x+y is even, contains all the M pixels.

Demosaicking starts with the sensing of edge directions 202. This is done by first computing the average of the absolute values of the horizontal gradients in a neighborhood of each pixel and comparing it with the average of the absolute values of the vertical gradients in the same neighborhood, and picking the direction with the lower average absolute value of the gradient. Formally, for every pixel (x, y) such that none of the 4 pixels adjacent to it in the horizontal and vertical directions are of color S, $$\delta(x, y) = \begin{cases} |L(x-1, y) - L(x+1, y)| - \\ |L(x, y-1) - L(x, y+1)|, & \text{if } x+y \text{ is odd} \\ |M(x-1, y) - M(x+1, y)| - \\ |M(x, y-1) - M(x, y+1)|, & \text{if } x+y \text{ is even} \end{cases}$$

d(x, y) does not exist if one or more pixels adjacent to (x, y) is of the color S. Next let $\bar{\delta}(x, y)$ be the average of all $\delta(i, j)$ that exist in a small neighborhood, of say 5×5 pixels, centered around the pixel location (x, y). For a predefined threshold $\tau$, edge direction E is determined as follows:

$$E = \begin{cases} \text{horizontal, for } \bar{\delta} < -\tau \\ \text{none, for } -\tau \leq \bar{\delta} \leq \tau \\ \text{vertical, for } \bar{\delta} > \tau \end{cases}$$

As the next step in demosaicking, L, M values are interpolated at the S pixel locations 204. If the location (x, y) has a pixel of color S and x+y is odd $$L(x, y) = \begin{cases} \dfrac{L(x-2, y) + L(x+2, y)}{2}, & \text{if } E = \text{horizontal} \\ \dfrac{L(x, y-2) + L(x, y+2)}{2}, & \text{if } E = \text{vertical} \\ \dfrac{L(x-1, y-1) + L(x-1, y+1) + L(x+1, y+1) + L(x+1, y-1)}{4}, & \text{if } E = \text{none} \end{cases}$$

If location (x, y) has a pixel of color S and x+y is even $$M(x, y) = \begin{cases} \dfrac{M(x-2, y) + M(x+2, y)}{2}, & \text{if } E = \text{horizontal} \\ \dfrac{M(x, y-2) + M(x, y+2)}{2}, & \text{if } E = \text{vertical} \\ \dfrac{M(x-1, y-1) + M(x-1, y+1) + M(x+1, y+1) + M(x+1, y-1)}{4}, & \text{if } E = \text{none} \end{cases}$$

Now L is available at all pixels (x, y) in the quincunx lattice where x+y is odd and M is available at all pixels in the other quincunx lattice where x+y is even.

The next step is to interpolate the full L, M color planes 206. A number of algorithms used to reconstruct the green color plane for the Bayer color filter array can be repurposed to reconstruct L, M by one with ordinary skill in the art. Using one popular interpolation algorithm, the Laplacian, L can be interpolated at pixel locations (x, y), where x+y is even as:

$$L(x, y) = \begin{cases} \dfrac{L(x-y, y) + L(x+1, y)}{2} + \dfrac{2*M(x, y) - M(x-2, y) - M(x+2, y)}{4}, & \text{if } E = \text{horizontal} \\ \dfrac{L(x, y-1) + L(x, y+1)}{2} + \dfrac{2*M(x, y) - M(x, y-2) - M(x, y+2)}{4}, & \text{if } E = \text{vertical} \\ \dfrac{L(x+1, y) + L(x, y+1) + L(x-1, y) + L(x, y-1)}{4} + \\ \dfrac{4*M(x, y) - M(x+2, y) - M(x, y+2) - M(x-2, y) - M(x, y-2)}{8}, & \text{if } E = \text{none} \end{cases}$$

if x+y is odd, $$M(x, y) = \begin{cases} \dfrac{M(x-y, y) + M(x+1, y)}{2} + \dfrac{2*L(x, y) - L(x-2, y) - L(x+2, y)}{4}, & \text{if } E = \text{horizontal} \\ \dfrac{M(x, y-1) + M(x, y+1)}{2} + \dfrac{2*L(x, y) - L(x, y-2) - L(x, y+2)}{4}, & \text{if } E = \text{vertical} \\ \dfrac{M(x+1, y) + M(x, y+1) + M(x-1, y) + M(x, y-1)}{4} + \\ \dfrac{4*L(x, y) - L(x+2, y) - L(x, y+2) - L(x-2, y) - L(x, y-2)}{8}, & \text{if } E = \text{none} \end{cases}$$

A guide image G is generated as a linear combination of L, M. The S color plane is then reconstructed by guided upsampling of the S pixels with G as the guide image 208. Guided upsampling techniques are known to one with ordinary skill in the art. For instance, see J. Kopf, M. F. Cohen, D. Lischinski, and M. Uyttendaele "Joint bilateral upsampling," ACM Transactions on Graphics, vol. 26 (3), no. 96, 2007 and also He, Kaiming, Jian Sun, and Xiaoou Tang. "Guided image filtering." IEEE transactions on pattern analysis and machine intelligence 35.6 (2012): 1397-1409.

A chroma denoiser is applied to the fully demosaicked image. The image is first converted, 210, to the $YC_1C_2$ color space where Y is the luminance and $C_1$, $C_2$ are the two chrominances as follows:

$$\begin{bmatrix} Y \\ C_1 \\ C_2 \end{bmatrix} = \begin{bmatrix} a_{11} & a_{12} & a_{13} \\ a_{21} & a_{22} & a_{23} \\ a_{31} & a_{32} & a_{33} \end{bmatrix} \begin{bmatrix} L \\ M \\ S \end{bmatrix}$$

$a_{11}$, $a_{12}$, $a_{13}$ are chosen so as to maximize the average SNR of Y on gray image features. SNR can be maximized for low light, read noise limited, exposures or bright light, shot noise limited, exposures or a compromise of the two. Optionally, constrain $a_{11}+a_{12}+a_{13}=1$, $a_{21}+a_{22}+a_{23}=0$ and $a_{31}+a_{32}+a_{33}=0$.

Alternately, the image is converted, 210, to the $YC_LC_MC_S$ color space where Y is the luminance and $C_L$, $C_M$, $C_S$ are the three color difference signals as follows:

$$\begin{bmatrix} Y \\ C_L \\ C_M \\ C_S \end{bmatrix} = \begin{bmatrix} a_1 & a_2 & a_3 \\ 1-a_1 & -a_2 & -a_3 \\ -a_1 & 1-a_2 & -a_3 \\ -a_1 & -a_2 & 1-a_3 \end{bmatrix} \begin{bmatrix} L \\ M \\ S \end{bmatrix}$$

$a_{11}$, $a_{12}$, $a_{13}$ are chosen so as to maximize the SNR of Y on gray image features. SNR can be maximized for low light, read noise limited, exposures or bright light, shot noise limited, exposures or a compromise between the two. Also, constrain $a_1+a_2+a_3=1$.

A chroma denoiser, 212, that leverages the high SNR of Y is used to denoise the chrominance signals $C_1$, $C_2$ or $C_L$, $C_M$, $C_S$, depending on the color space used. A possible chroma denoiser implementation is the bilateral or sigma filter adapted to use Y and the chrominance channels in its edge stopping function, for instance see Tomasi, Carlo, and Roberto Manduchi. "Bilateral filtering for gray and color images." Sixth international conference on computer vision (IEEE Cat. No. 98CH36271). IEEE, 1998 and Lee, Jong-Sen. "Digital image smoothing and the sigma filter." Computer vision, graphics, and image processing 24.2 (1983): 255-269. Other possibilities are non local denoisers adapted to include Y and the chrominance channels in their block matching functions, for instance see Buades, Antoni, Bartomeu Coll, and JeanMichel Morel. "Non-local means denoising." Image Processing On Line 1 (2011): 208-212. Wavelet and other dictionary denoisers can also be adapted to include Y and the chrominance channels in determining the shrinkage or other adaptation of the transform coefficients, for instance see Portilla, Javier, et al. "Image denoising using scale mixtures of Gaussians in the wavelet domain." IEEE Transactions on Image processing 12.11 (2003): 1338-1351 and Elad, Michael, and Michal Aharon. "Image denoising via sparse and redundant representations over learned dictionaries." IEEE Transactions on Image processing 15.12 (2006): 3736-3745. Locally affine color model based filters such as the guided image filter can be used with Y as a the guide image to serve as a chroma denoiser of the image in any color space, for instance see He, Kaiming, Jian Sun, and Xiaoou Tang. "Guided image filtering." IEEE transactions on pattern analysis and machine intelligence 35.6 (2012): 1397-1409. These chroma denoiser adaptations can be performed by one of ordinary skill in the art.

Chroma denoisers can be used in a multi-scale setting by decomposing the image into a Laplacian Pyramid and applying the chroma denoiser at each level of the pyramid.

The denoised $YC_1C_2$ or $YC_LC_MC_S$ image is converted, 214, to the RGB or other color space for further processing or output.

Generalization

The L, M, S CFA can be generalized to a CFA comprising of colors with high density of pixels and colors with low density of pixels. The associated image signal processor first demosaicks the high density colors, takes their linear combination to obtain a guide image and then demosaicks the low density colors by guided upsampling. Next, the ISP applies a chroma denoiser followed by conversion to the desired color space.

Colors with substantially low color separation are assigned substantially high density of pixels in the CFA. After applying appropriate gain and white balance, if the color space conversion performed by the image signal processor is linear, it can be represented as:

$$\begin{bmatrix} Y_1 \\ Y_2 \\ \vdots \\ Y_M \end{bmatrix} = \begin{bmatrix} a_{11} & a_{12} & \cdots & a_{1N} \\ a_{21} & a_{22} & \cdots & a_{2N} \\ \vdots & \vdots & & \vdots \\ a_{M1} & a_{M2} & \cdots & a_{MN} \end{bmatrix} \begin{bmatrix} X_1 \\ X_2 \\ \vdots \\ X_N \end{bmatrix}$$

where $$X = \begin{bmatrix} X_1 \\ X_2 \\ \vdots \\ X_N \end{bmatrix}$$

is the color space of the image sensor and $$Y = \begin{bmatrix} Y_1 \\ Y_2 \\ \vdots \\ Y_M \end{bmatrix}$$

is the output color space, and the above color transformation leaves gray shades unchanged. Note that the color space of Y should be defined in terms of color primaries and not luminance, chrominance. The "color separation" of color component $X_j$, $1 \leq j \leq N$ is defined as $$\frac{1}{\max(|a_{ij}|)}, 1 \leq i \leq M.$$

If a general, non-linear color space conversion method is employed, the metric "color separation" of a specified color component in the image sensor color space is defined as the reciprocal of the absolute value of the largest additive or subtractive effect of the specified color component in the color space conversion step of any of the output color components. As in the linear color space conversion case, colors with substantially low color separation are assigned substantially high density of pixels in the CFA.

In accordance with the present invention, colors with higher color separation are generally assigned a lower density of pixels, whereas, colors with lower color separation are generally assigned a higher density of pixels. This holds true for colors having a substantially higher color separation but may not always hold true for colors having insubstantial color separation. In other words, the assignments of pixel density is not necessarily monotonic for colors that don't have a substantial difference in color separation. For example, there is insubstantial difference in color separation of colors L and M, though M has slightly higher color separation than L. Therefore, in accordance with an embodiment of the present invention, the color M could be, in one instance, assigned a higher density of pixels than L, even though M has slightly higher color separation. This could be desirable for other reasons, for example, because the human visual system captures finer detail in the color M. In another instance, color M could be assigned a lower density of pixels than the color L. Conversely, the color S has much higher color separation than colors L or M and will, therefore, preferably always have far fewer pixels assigned than L or M. Therefore, in accordance with an embodiment of the present invention, colors with a substantially low color separation are assigned a substantially high density of pixels in the photosite array whereas colors with substantially high color separation are assigned a substantially low density of pixels in the photosite array.

What is claimed is:

1. A method of capturing color images comprising steps of:
   providing an image sensor having an array of light sensitive photosites of a plurality of colors, each color with its own spectral sensitivity, colors with a substantially low color separation being assigned a substantially high density of pixels in the photosite array and colors with substantially high color separation being assigned a substantially low density of pixels in the photosite array, with the color with the highest density of pixels containing at least 3 times as many pixels as the color with the lowest density of pixels and the maximum ratio of color separations of any two colors being over 2;
   employing said image sensor to produce raw image data by impacting the image sensor with light; and
   reconstructing a full color image from the raw image data using a digital image signal processor.

2. The method according to claim 1, wherein at least one color having an insubstantially higher color separation than another color is assigned an insubstantially higher density of pixels than the other color.

3. The method according to claim 1 wherein the reconstruction of said full color image comprises:
   demosaicking the raw image data to generate demosaicked image data; and
   applying a chroma denoiser to the demosaicked image data and converting the demosaicked image data to a specified color space, wherein application of the chroma denoiser and conversion to a specified color space are performed in any order.

4. The method according to claim 1 wherein
   photosites of two colors, labeled L and M, have low color separation, and photosites of the third color, labeled S, are present in lower density than the photosites of colors L, M and have high color separation.

5. The method according to claim 4 wherein the spectral sensitivities of colors L, M, S are an approximation of the spectral sensitivities of the L, M, S cones of the human retina, or an approximation of a linear combination of the spectral sensitivities of the L, M, S cones of the human retina.

6. The method according to claim 4 wherein the L color filters have higher transmittance than red color filters.

7. The method according to claim 5 wherein the photosite array comprising said image sensor is partitioned into two quincunx arrays with all the photosites of color L being on one quincunx array and all the photosites of color M being on the other quincunx array.

8. The method according to claim 3 wherein said full color image is reconstructed by:
   fully demosaicking color planes with higher density of photosites;
   defining a specified linear combination of said demosaicked color planes with said higher density photosites as the guide image; and
   using a guided demosaicker to reconstruct the color planes with said lower density of photosites.

9. The method according to claim 3 where noise is suppressed by:
   converting said full color image to a luminance-chrominance color space; and
   applying said chroma denoiser to the image in the luminance-chrominance color space;
   where the luminance is a weighted sum of the L, M, S color planes with weights chosen so that the average SNR is high or where the luminance is a non-linear function of the L, M, S color planes with high average SNR.

10. The method according to claim 9 wherein said chroma denoiser uses a sigma filter.

11. The method according to claim 9 wherein said chroma denoiser uses a bilateral filter.

12. The method according to claim 9 wherein said chroma denoiser is a wavelet denoiser.

13. The method according to claim 9 wherein said chroma denoiser is a dictionary based denoiser.

14. The method according to claim 9 wherein said chroma denoiser is a locally affine color model based filter such as the Guided Image Filter.

15. The method according to claim 9 wherein said chroma denoiser is applied in a multi-scale setting.

16. The method according to claim 15 wherein the image is decomposed into a Laplacian Pyramid and the chroma denoiser is applied at each level of the pyramid.

17. A system for capturing color images comprising:
   an image sensor comprising an array of light sensitive photosites of a plurality of colors, each color with its own spectral sensitivity, colors with a substantially low color separation being assigned a substantially high density of pixels in the photosite array and colors with substantially high color separation being assigned a substantially low density of pixels in the photosite array;
   digital image signal processor adapted to:
   receive a raw mosaicked image from said image sensor when the image sensor is impacted with light, and
   reconstruct a full color image from the raw image data.

18. The system according to claim 17, wherein at least one color having an insubstantially higher color separation than another color is assigned an insubstantially higher density of pixels than the other color.

19. The system according to claim 17 wherein the digital image signal processor is further adapted to:
   demosaick the raw image data to generate demosaicked image data;
   apply a chroma denoiser to the demosaicked image data and convert the demosaicked image data to a specified color space, wherein application of the chroma denoiser and conversion to a specified color space are performed in any order.

20. The system according to claim 17 wherein
   photosites of two colors, labeled L and M, have low color separation, and
   photosites of the third color, labeled S, are present in lower density than the photosites of colors L, M and have high color separation.

21. The system according to claim 20 wherein the spectral sensitivities of colors L, M, S are an approximation of the spectral sensitivities of the L, M, S cones of the human retina, or an approximation of a linear combination of the spectral sensitivities of the L, M, S cones of the human retina.

22. The system according to claim 20 wherein the L color filters have higher transmittance than red color filters.

23. The system according to claim 21 wherein the photosite array comprising said image sensor is partitioned into two quincunx arrays with all the photosites of color L being on one quincunx array and all the photosites of color M being on the other quincunx array.

24. The system according to claim 23 wherein the minimum repeating pattern of said photosite array with a regular arrangement of photosites of color S is:

L M S M L S
M L M L M L
L M L M L M
M L S L M S
L M L M L M
M L M L M L or its reflection, rotation, phases, swapping of L, M pixels or a combination thereof.

25. The system according to claim 23 wherein the minimum repeating pattern of said photosite array with an irregular arrangement of photosites of color S is:

L M S M L S
M L M L M L
L S L M L M
M L M L M S
L M L M L M
M L M L M L or its reflection, rotation, phases, swapping of L, M pixels or a combination thereof.

26. The system according to claim 23 wherein the minimum repeating pattern of said photosite array with a regular arrangement of photosites of color S is:

S M L M
M L M L
L M S M
M L M L or its reflection, rotation, phases, swapping of L, M pixels or a combination thereof.

27. The system according to claim 23 wherein the minimum repeating pattern of said photosite array with an irregular arrangement of photosites of color S is:

S M L M S M L M
M L M L M L M L
L M S M L M L S
M L M L M L M L or its reflection, rotation, phases, swapping of L, M pixels or a combination thereof.

28. The system according to claim 23 wherein said photosite array is binnable and has a minimum repeating pattern with a regular arrangement of photosites of color S as follows:

L M L M
M L M L
L M S M
M L M S or its reflection, rotation, phases, swapping of L, M pixels or a combination thereof; and the minimum repeating pattern is partitioned into tiles of 2×2 photosites, all photosites of a color are binned and one value per color per tile of said raw image data is generated.

29. The system according to claim 23 wherein said photosite array is binnable and has a minimum repeating pattern with an irregular arrangement of photosites of color S as follows:

L M L M L M L M
M L M L M L M L
L M S M L M L S
M L M S M L S L
L M L M L M L M
M L M L M L M L
L M L S L M S M
M L S L M L M S or its reflection, rotation, phases, swapping of L, M pixels or a combination thereof; and the minimum repeating pattern is partitioned into tiles of 2×2 photosites, all photosites of a color are binned and one value per color per tile of said raw image data is generated.

30. The system according to claim 23 wherein said photosite array is binnable and has a minimum repeating pattern as follows:

L M L M L M
M L M L M L
L M L M L M
M L M S M S
L M L M S M
M L M S M S or its reflection, rotation, phases, swapping of L, M pixels or a combination thereof; and the minimum repeating pattern is partitioned into tiles of 3×3 photosites, all photosites of a color are binned and one value per color per tile of said raw image data is generated.

31. The system according to claim 23 wherein said photosite array is binnable and has a minimum repeating pattern as follows:

L M L M L M
M L M L M L
L M L M L M
M L M L S L
L M L S L S
M L M L S L or its reflection, rotation, phases, swapping of L, M pixels or a combination thereof; and the minimum repeating pattern is partitioned into tiles of 3×3 photosites, all photosites of a color are binned and one value per color per tile of said raw image data is generated.

32. The system according to claim 23 wherein said photosite array is binnable and has a minimum repeating pattern as follows:

L M L M L M L M
M L M L M L M L
L M L M L M L M
M L M L M L M L
L M L M S M S M
M L M L M S M S
L M L M S M S M
M L M L M S M S or its reflection, rotation, phases, swapping of L, M pixels or a combination thereof; and the minimum repeating pattern is partitioned into tiles of 4×4 photosites, all photosites of a color are binned and one value per color per tile of said raw image data is generated.

33. The system according to claim 19 wherein said full color image is reconstructed by:
fully demosaicking color planes with higher density of photosites;
defining a specified linear combination of said demosaicked color planes with said higher density photosites as the guide image; and
using a guided demosaicker to reconstruct the color planes with said lower density of photosites.

34. The system according to claim 19 where noise is suppressed by the digital image signal processor by:
converting said full color image to a luminance-chrominance color space; and
applying said chroma denoiser to the image in the luminance-chrominance color space;

where the luminance is a weighted sum of the L, M, S color planes with weights chosen so that the average SNR is high or where the luminance is a non-linear function of the L, M, S color planes with high average SNR.

* * * * *